United States Patent [19]
Markey

[11] Patent Number: 5,964,147
[45] Date of Patent: Oct. 12, 1999

[54] FRUIT OR VEGETABLE PRESERVATION DEVICE

[76] Inventor: Craig J. Markey, 15112 Larry St., Poway, Calif. 92064

[21] Appl. No.: 09/262,966

[22] Filed: Mar. 4, 1999

Related U.S. Application Data

[62] Division of application No. 08/989,745, Dec. 12, 1997.

[51] Int. Cl.[6] .................................................. A23N 15/00
[52] U.S. Cl. ............................................................ 99/645
[58] Field of Search .................................... 426/115, 132, 426/418, 419, 420; 99/645

[56] References Cited

U.S. PATENT DOCUMENTS

| | | | |
|---|---|---|---|
| 170,223 | 11/1875 | Black | 99/645 |
| 787,021 | 4/1905 | Bibir | 99/645 |
| 1,013,244 | 1/1912 | Watson | 426/132 |
| 2,598,789 | 10/1952 | Harrell | 99/645 |
| 2,716,066 | 6/1955 | Baker | 426/132 |
| 3,139,348 | 6/1964 | Reifers et al. | 426/132 |
| 3,677,168 | 7/1972 | Bell | 99/645 |
| 4,061,785 | 12/1977 | Nishino et al. | 426/124 |
| 4,777,054 | 10/1988 | Greenhouse | 426/115 |
| 4,795,033 | 1/1989 | Duffy | 206/257 |

FOREIGN PATENT DOCUMENTS

| | | | |
|---|---|---|---|
| 529657 | 7/1931 | Germany | 426/132 |

*Primary Examiner*—David Lacey
*Assistant Examiner*—Sherry A. Dauerman
*Attorney, Agent, or Firm*—Lyon & Lyon LLP

[57] ABSTRACT

A preservation device for preserving a partially eaten portion of a fruit or vegetable having a skin and at least one exposed surface includes a pair of arms. Each arm extends in a longitudinal direction and has a distal portion and a proximal portion. The arms are pivotally connected to each other for movement of the distal portion between an open position for engaging the at least one exposed surface of the partially eaten fruit or vegetable portion and a closed position where the at least one exposed surface of the partially eaten fruit or vegetable portion is engaged with the preservation device. A flat plate is carried by the arm in the distal portion of the arm. The flat plate extends generally perpendicular to the longitudinal direction of the arm and is adapted to engage the exposed surface of the fruit or vegetable for preservation purposes.

8 Claims, 2 Drawing Sheets

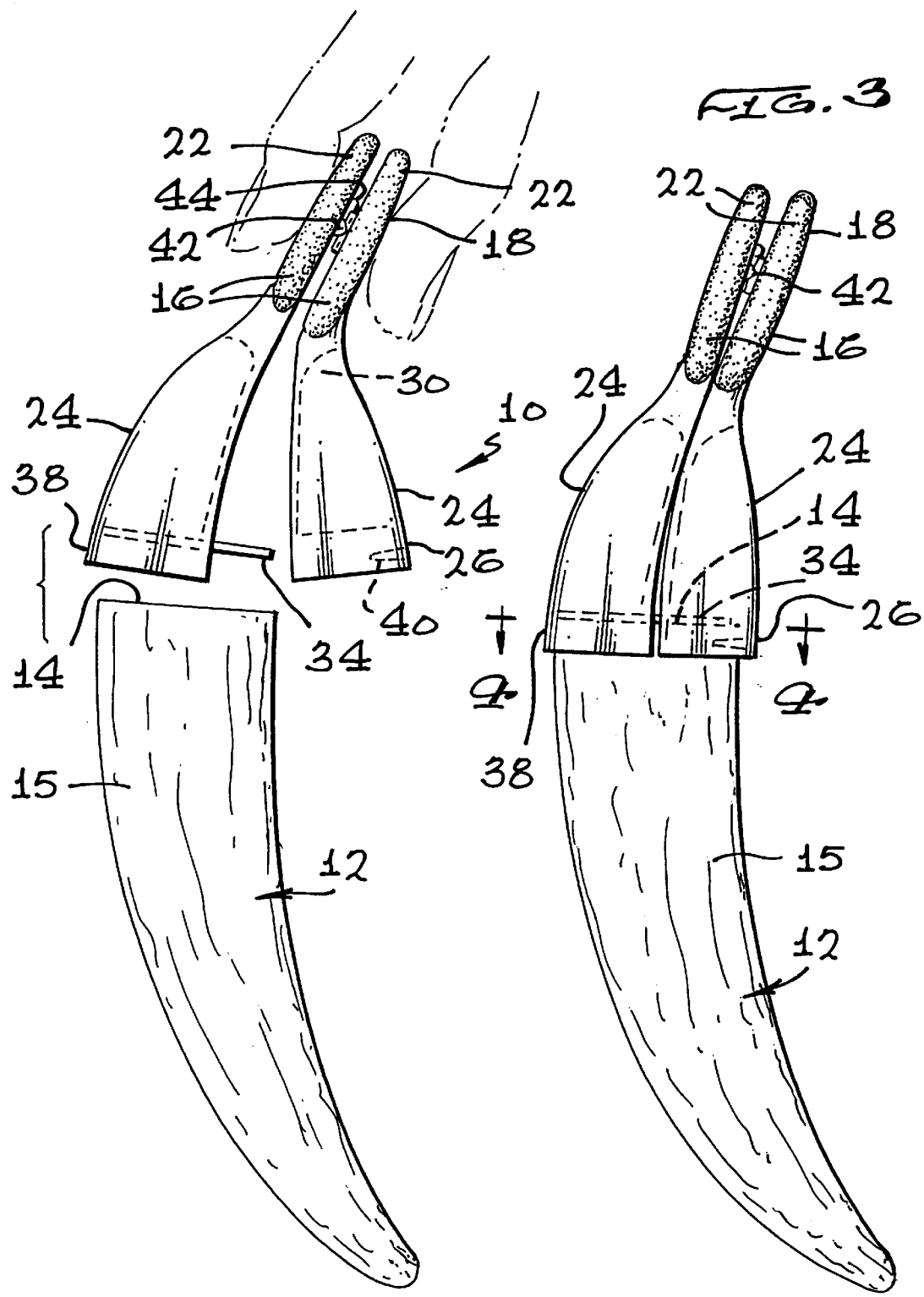

FRUIT OR VEGETABLE PRESERVATION DEVICE

This is a divisional of co-pending application Ser. No. 08/989,745 filed Dec. 12, 1997.

BACKGROUND OF THE INVENTION

1. Field of the Invention

This invention relates, in general, to devices for preserving fruits or vegetables and, in particular, to devices for preserving partially eaten fruits or vegetables.

2. Discussion of Related Art

Fruits and vegetables, especially bananas and cucumbers, are often not completely consumed in one sitting. When this occurs, the consumer has the option of throwing away the partially eaten portion, creating waste, or keeping the partially eaten portion until a later date to be consumed. Keeping the partially eaten portion usually entails attempting to preserve the partially eaten portion by placing it within an air-tight container or plastic bag and placing the partially eaten portion and container/bag in a refrigerator.

Regardless of the method used to store the partially eaten portion of the fruit or vegetable, the inner part of the fruit or vegetable that is exposed after initial consumption and surrounding area deteriorates and rots quickly because of its exposure to air trapped in the container or bag. If the partially eaten portion is not protected by a bag or container, the exposed part also becomes susceptible to the inroads of flies and other insects.

The closest known related art includes devices for preserving the partially eaten portion of a round block of cheese. These devices typically include a hinged assembly with a pair of faces. After a wedge of cheese is removed from a round block of cheese, the pair of faces are manipulated so that each face lies against a fresh-cut, exposed cheese surface of the partially eaten block. The faces protect the exposed cheese from air, insects, etc. Some of these cheese preservation devices include locking mechanisms that secure the faces against the cheese surfaces.

SUMMARY OF THE INVENTION

It is an object of the present invention to provide a fruit or vegetable preservation device that preserves the partially eaten portion of a fruit or vegetable, especially a banana or a cucumber.

It is a further object of the present invention to provide a fruit or vegetable preservation device that is easy and quickly to engage with the partially eaten portion of the fruit or vegetable.

It is an additional object of the present invention to provide a fruit or vegetable preservation device with means for retaining the preservation device to the fruit or vegetable.

These objects, and others are achieved by an aspect of the present invention which includes a preservation device for preserving a partially eaten portion of a fruit or vegetable having a skin and at least one exposed surface. The preservation device has a pair of arms. Each arm extends in a longitudinal direction and has a distal portion and a proximal portion. The arms are pivotally connected to each other for movement of the distal portion between an open position for engaging the at least one exposed surface of the partially eaten fruit or vegetable portion and a closed position where the at least one exposed surface of the partially eaten fruit or vegetable portion is engaged with the preservation device. A flat plate is carried by the arm in the distal portion of the arm.

The flat plate extends generally perpendicular to the longitudinal direction of the arm and is adapted to engage the exposed surface of the fruit or vegetable for preservation purposes.

An additional aspect of the present invention includes a method for preserving a partially eaten portion of a fruit or vegetable with a skin and cut so as to form a generally flat, exposed face. The method includes the steps of providing a preservation assembly with a pair of arms having respective distal and proximal portions, a flat plate secured to the distal portion of the arm, the arms pivotally connected to each other for movement of the distal portions between an open and closed position; opening the distal portion of the arms of the preservation assembly by pivoting the arms; bringing the flat plate of the preservation assembly into flush contact with the exposed face of the partially eaten fruit or vegetable, causing surface tension between the flat plate and exposed face to retain the flat plate against the exposed face, preserving the fruit or vegetable; and closing the distal portion of the arms of the preservation assembly by pivoting the arms.

BRIEF DESCRIPTION OF THE DRAWINGS

These and other features of the invention will now be described with reference to the drawings of a preferred embodiment, which are intended to illustrate and are not to limit the invention, and in which:

FIG. 3 is a view similar to FIG. 2, but shows the fruit preservation device in a closed position and engaged with the partially eaten banana; and FIG. 4 is a top portion cross-sectional view of the fruit or vegetable preservation device of FIG. 1 taken along lines 4—4 of FIG. 3.

DETAILED DESCRIPTION OF PREFERRED EMBODIMENTS

Figure 1:
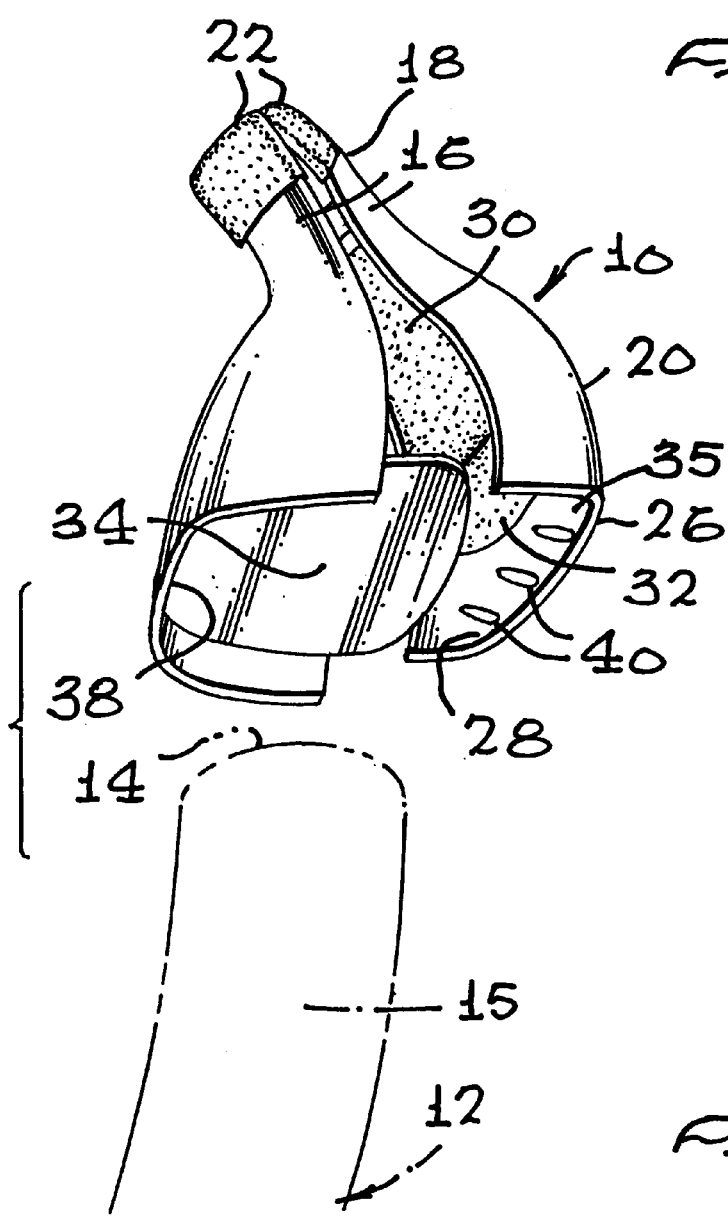
FIG. 1 is a perspective view of an embodiment of the fruit or vegetable preservation device of the present invention and includes a partially eaten banana portion shown with phantom lines.
Figure 2:
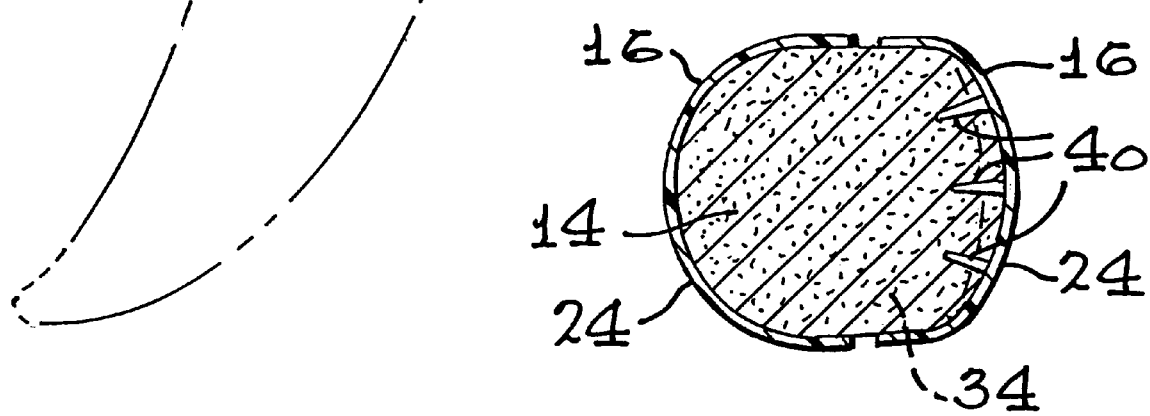
FIG. 2 is a side view of a fruit or vegetable preservation device constructed in accordance with an additional embodiment of the invention, with portions of the device shown with hidden lines, and illustrates the preservation device in an open position for engagement with a partially eaten banana.

With reference to FIGS. 1–3, a fruit or vegetable preservation device 10 constructed in accordance with two slightly different, embodiments of the invention is shown in conjunction with a partially eaten banana portion 12. The partially eaten banana portion 12 has an exposed flat face or surface 14 cut with a knife or other sharp instrument and sides 15. Although the fruit or vegetable device 10 is shown in conjunction with a banana 12, it will be readily understood by those skilled in the art that the present invention may be used in conjunction with other fruits or vegetables, such as, without limitation, a cucumber.

The preservation device 10 includes a pair of arms 16 that extend in a general longitudinal direction. Each arm has a proximal portion 18 and a distal portion 20. The proximal portion 18 terminates in a finger-pinching piece 22. The distal portion includes a body or shell 24 that terminates in a distal end 26. The arms 16 are made of a durable, dish-washer safe, plastic material and are preferably molded as a single-piece construction. However, as illustrated in the embodiment of FIGS. 2 and 3, each arm 16 may include a two-piece construction that includes, for example, a body or shell portion carried by a proximal portion.

Each body 24 has a shape, color, size and appearance that, when positioned next to the other (FIG. 3), conforms to the general shape, color, size and appearance of the partially eaten banana portion 12.

An inner part of each body 24 includes a channel 28 in which a support piece 30 may be affixed to an inside wall of the body 24. The support piece 30 includes a flat end 32.

On the flat end 32 of one of the support pieces 30, a flat plate or disk 34 may be affixed. Alternatively, if a support piece 30, is not provided, the flat plate 34 maybe affixed within one of the channels 28 to an inside wall 35 of the body 24 along its peripheral edge 36. The flat plate 34 extends from the channel 28 in a direction generally perpendicular to the longitudinal direction of the arm 16 it is attached to. The flat plate 34 has a surface area that is greater than the surface area of the exposed flat face 14 of the partially eaten portion banana 12. The flat plate 34 is provided at a pre-determined distance from the distal end 26 of the arm 16 in order to create an overhang 38.

At least one tooth 40 extends inwardly from at least one of the overhangs near the distal end 26 in a direction generally perpendicular to the longitudinal direction of the arm 16.

FIGS. 2 and 3 illustrate an embodiment with the flat plate 34 and at least tooth 40 of the invention extending from an opposite arm 16 than that shown in the embodiment of FIG. 1.

As illustrated in FIG. 2, the arms 16 are pivotally connected to each other with a fulcrum or pivot mechanism 42. A spring mechanism 44 is operably inter-related with the arms 16 and fulcrum mechanism 42 imparting an inward gripping, clipping or closing force to the distal portions 24 (FIG. 3.). Fulcrum mechanisms and spring mechanisms are well known in the art and, therefore, will not be described in any greater detail.

With reference to FIGS. 1–3, the fruit or vegetable preservation device 10 will now be described in use. After a banana is partially eaten by a consumer or user, the partially eaten portion 12 is cut so as to form an exposed flat face 14. The user grabs the preservation device 10 at the proximal portions 18 and pinches the finger-pinching pieces 22, causing the arms 16 to pivot in a manner so that the distal portions 20 open or separate (FIG. 2).

Once the distal portions 20 are moved to an open position, the preservation device 10 and partially eaten banana portion 12 are brought together so that the flat surface of the plate 34 is engaged or flushly contacted with the exposed flat surface of the partially eaten banana portion 12.

The finger-pinching pieces 22 are released, allowing the spring mechanism 44 to close or bring the distal portions 20 together (FIG. 3). Without the finger-pinching pieces 22 pinched, the spring mechanism 44 is free to impart a gripping force to the distal portions 20, causing the at least one tooth 40 to engage or bite into the skin or sides 15 (FIG. 4) of the partially eaten portion 12. The preservation device 10 is retained to the exposed flat surface 14 of the partially eaten banana portion 12 through this gripping and biting action. Surface tension between the flat plate 34 and the exposed flat surface 14 of the partially eaten portion 12 also helps retain the preservation device 10 to the exposed flat surface 14.

Because the surface area of the flat plate 34 is greater than the surface area of the exposed flat surface 14 of the banana portion 12, the flat plate 34 protects the exposed flat surface 14 of the partially eaten portion 12 from air, flies, or other factors that exacerbate rotting, deterioration and contamination of the partially eaten portion 12.

The overhang 38 extends partially along the skin or sides 15 of the partially eaten banana portion 12, giving the preservation device 10 a flush appearance with the partially eaten banana portion 12 and allowing the sides 15 to be gripped by the at least one tooth 40 extending inwardly from overhang 38. If the at least one tooth 40 only extends from one of the distal portions 20, or if no teeth are provided, the inner wall 35 of the overhang 38 without teeth cooperates with the opposite inner wall 35 or at least one tooth 40 to provide some gripping action.

When it is desired to consume the partially eaten banana portion 12, the user simply pinches the finger-pinching pieces 22 of the proximal portions 18. This opens and separates the distal portions 20, allowing the preservation device 10 to be easily removed.

The above-described fruit or vegetable preservation device 10 provides a quick, easy way to preserve the partially eaten portion of a fruit or vegetable, eliminating unnecessary waste.

Although this invention has been described in terms of a preferred embodiment, other embodiments apparent to those of ordinary skill in the art are also within the scope of this invention. Accordingly, the scope of this invention is intended to be defined only by the claims that follow.

What is claimed is:

1. A preservation device for preserving a partially eaten portion of a fruit or vegetable that includes a skin and at least one generally flat exposed surface, the preservation device comprising:

a pair of arms, each arm extending in a longitudinal direction and having a distal portion and a proximal portion, the arms pivotally connected to each other for movement of said distal portion between an open position for engaging said at least one generally flat exposed surface of the partially eaten fruit or vegetable portion and a closed position where said at least one exposed surface of the partially eaten fruit or vegetable portion is engaged with the preservation device, and a flat plate carried by the arm in the distal portion of the arm, the flat plate extending generally perpendicular to the longitudinal direction of the arm and adapted to engage the exposed surface of the fruit or vegetable for preservation purposes.

2. The preservation device of claim 1, further including a spring mechanism operably interrelated with the arms for imparting a gripping force to the distal portions.

3. The preservation device of claim 1, further including at least one tooth that extends inwardly from the distal portion of at least one of the arms.

4. The preservation device of claim 1, wherein the distal portion of the arms includes a distal end and the perpendicular flat plate is spaced in a predetermined distance from the distal end so that part of the distal portion is adapted to overlap the skin of the fruit or vegetable adjacent the exposed surface.

5. The preservation device of claim 1, wherein the arms and flat plate are made of a durable, plastic, dishwasher-safe material.

6. The preservation device of claim 1, further including a support piece carried by at least one of said arms for supporting said flat plate.

7. The preservation device of claim 1, wherein each arm includes a body constructed to have a shape, color, size and appearance that, when combined, generally conforms to the shape color, size and appearance of the partially eaten portion of the fruit or vegetable.

8. The preservation device of claim 1, wherein the flat plate includes a surface area that is larger than the surface area of the exposed end.

* * * * *